United States Patent
Ito et al.

(10) Patent No.: US 7,638,086 B2
(45) Date of Patent: Dec. 29, 2009

(54) MANUFACTURING METHOD OF PLUGGED HONEYCOMB STRUCTURE

(75) Inventors: Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 19 days.

(21) Appl. No.: 11/954,366

(22) Filed: Dec. 12, 2007

(65) Prior Publication Data
US 2008/0164643 A1    Jul. 10, 2008

(30) Foreign Application Priority Data
Jan. 5, 2007    (JP)  ............................ 2007-000375

(51) Int. Cl.
*B28B 1/00*    (2006.01)
(52) U.S. Cl. ........................ 264/630; 428/117
(58) Field of Classification Search ................ 264/630, 264/631; 428/117
See application file for complete search history.

(56) References Cited

U.S. PATENT DOCUMENTS

| | | | |
|---|---|---|---|
| 2004/0071932 A1* | 4/2004 | Ishihara et al. | 428/116 |
| 2006/0103057 A1* | 5/2006 | Kouketsu | 264/630 |

FOREIGN PATENT DOCUMENTS

| | | |
|---|---|---|
| JP | A 1-221216 | 9/1989 |
| JP | A 6-190218 | 7/1994 |
| JP | A 6-190224 | 7/1994 |
| JP | A 2001-300922 | 10/2001 |
| JP | A 2005-218209 | 8/2005 |
| WO | WO 2006/062141 A1 | 6/2006 |

OTHER PUBLICATIONS

Pending U.S. Patent Application; filed Dec. 12, 2007; Ito, Koichi.

* cited by examiner

*Primary Examiner*—Steven P Griffin
*Assistant Examiner*—Erin Snelting
(74) *Attorney, Agent, or Firm*—Oliff & Berridge, PLC

(57) ABSTRACT

A manufacturing method of a plugged honeycomb structure 30 which comprises a honeycomb substrate 1 and plugging portions 15 arranged so as to form complementary checkered patterns alternately at both end surfaces 11 and 21 of the honeycomb substrate 1. The method comprises attaching mask films 4a and 4b to both end surfaces 11 and 21 of the honeycomb substrate 1, respectively; forming slurry permeation holes 3a at portions of the mask films 4a and 4b corresponding to cell opening end portions 7, respectively; forming deaeration holes 3b at portions of the mask films 4a and 4b facing the portions provided with the slurry permeation holes 3a via cells 2; submerging both end surfaces 11 and 21 of the honeycomb substrate 1 to which the mask films 4a and 4b have been attached into a plugging slurry 6, respectively; and firing the resultant slurry filled substrate 20.

7 Claims, 3 Drawing Sheets
(1 of 3 Drawing Sheet(s) Filed in Color)

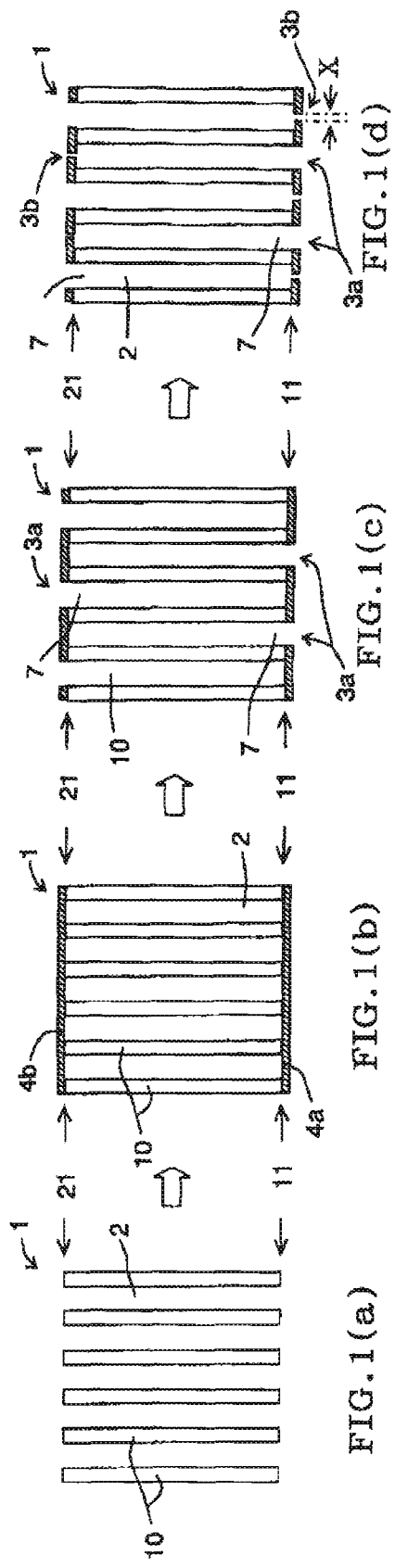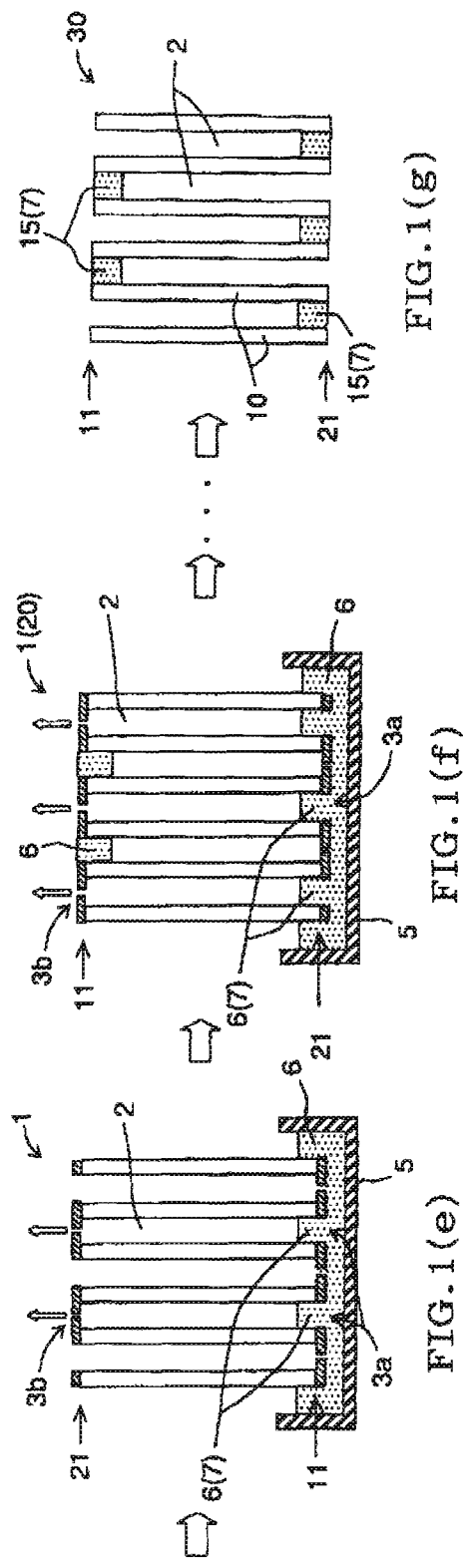

MANUFACTURING METHOD OF PLUGGED HONEYCOMB STRUCTURE

BACKGROUND OF THE INVENTION

1. Field of the Invention

The present invention relates to a manufacturing method of a plugged honeycomb structure which can preferably be used in a filter such as a diesel particulate filter and in which predetermined cells at an end surface of the structure are plugged.

2. Description of the Related Art

As a dust collecting filter typified by a diesel particulate filter (DPF), a filter having a honeycomb structure and made of a ceramic is used. Such a filter has a honeycomb structure having a large number of cells which are separated and formed by porous partition walls so as to constitute channels of a fluid, and each cell is plugged on one end portion opposite to that of an adjacent cell so that each end surface of the honeycomb structure has a checkered pattern.

When an exhaust gas including fine particles such as particulates is passed from one end surface of the filter (a plugged honeycomb structure), the exhaust gas flows into the structure from the cells having the end portions which are not plugged on the one end surface, passes through the porous partition walls and enters the other cells having end portions which are not plugged on the other end surface of the structure. Then, when the exhaust gas passes through the partition walls, the fine particles in the exhaust gas are trapped by the partition walls, and the cleaned exhaust gas from which the fine particles have been removed is discharged from the other end surface of the honeycomb structure.

Usually, to manufacture the plugged honeycomb structure having such a configuration, a method is employed in which as shown in FIG. 2, a mask film 4 to constitute a mask is attached to an end surface of a honeycomb substrate 1, holes 3 are provided at positions corresponding to opening end portions (cell opening end portions 7) of predetermined cells 2a and 2b of the mask film 4, and an end portion of the honeycomb substrate 1 is submerged into a container 5 in which a plugging slurry 6 is stored, whereby the plugging slurry 6 is allowed to permeate the predetermined cell opening end portions 7 through the holes 3 of the mask film 4 (e.g., see Patent Document 1).

In a case where the opening end portions of the predetermined cells are plugged by such a method, the slurry 6 for plugging does not sometimes permeate into a desired depth of the cells 2a and 2b. Moreover, the permeation depth of the plugging slurry in the cells 2a and 2b is not sometimes uniform, and there has been a problem that it is difficult to manufacture a homogeneous plugged honeycomb structure. In a case where the permeation depth of the plugging slurry which permeates the respective cells to be plugged is not uniform, fluctuations are generated in a pressure loss of each cell of the resultant plugged honeycomb structure, and a disadvantage that deviation is generated in a deposited amount of filtered matters or the like easily occurs.

As a concerned conventional technology for solving the above problems, a method is disclosed in which the plugging slurry having thixotropy is used, and the plugging slurry is allowed to permeate the predetermined cells of the honeycomb substrate while vibrated (e.g., see Patent Documents 2 and 3).

However, even in the methods disclosed in Patent Documents 2 and 3, there is a case where the plugging slurry 6 does not always permeate into the desired depth of the cells 2a and 2b, and the permeation depth is not uniform. Since a device for vibrating the plugging slurry is required, there is a tendency that manufacturing facilities to be used become huge and complicated.

[Patent Document 1] JP-A 2001-300922
[Patent Document 2] JP-A 6-190218
[Patent Document 3] JP-A 6-190224

SUMMARY OF THE INVENTION

The present invention has been developed in view of such problems of the conventional technology, and an object thereof is to provide a manufacturing method of a plugged honeycomb structure in which a plugging slurry can uniformly be allowed to permeate into a desired depth of cells, and a product defect such as plugging failure is hardly generated easily.

That is, according to the present invention, there is provided the following manufacturing method of a plugged honeycomb structure.

[1] A manufacturing method of a plugged honeycomb structure including a cylindrical honeycomb substrate in which a plurality of cells having two opening end portions are separated by partition walls and formed so as to communicate with both end surfaces of the honeycomb substrate, and plugging portions arranged so as to plug one of the two opening end portions of the cells and form a complementary checkered pattern with one end surface and the other end surface of the honeycomb substrate, the method comprising: an attaching step of attaching mask films to both the end surfaces of the honeycomb substrate, respectively; a first perforation step of making slurry permeation holes at portions of the mask films corresponding to the one opening end portion of each of the predetermined cells; a second perforation step of making deaeration holes having a diameter of 0.02 to 0.8 mm at portions of the mask films facing the portions provided with the slurry permeation holes via the cells; a filling step of submerging both the end surfaces of the honeycomb substrate to which the mask films have been attached into a plugging slurry having a viscosity of 0.5 to 2000 Pa·s, respectively, and filling the one opening end portion of each of the predetermined cells with the plugging slurry to obtain a slurry filled substrate; and a firing step of firing the resultant slurry filled substrate.

[2] The manufacturing method of the plugged honeycomb structure according to the above [1], wherein the deaeration holes have a diameter in a range of 0.5 to 0.4 mm.

[3] The manufacturing method of the plugged honeycomb structure according to the above [1] or [2], wherein the plugging slurry has a viscosity in a range of 1 to 1500 Pa·s.

[4] The manufacturing method of the plugged honeycomb structure according to any one of the above [1] to [3], wherein the plugging slurry has thixotropy, and the one opening end portion of each of the predetermined cells is filled with the plugging slurry while vibrating the plugging slurry.

According to the manufacturing method of the plugged honeycomb structure of the present invention, it is possible to easily manufacture the plugged honeycomb structure in which the plugging slurry can be allowed to uniformly permeate into a desired depth of the cells and a product defect such as plugging failure is hardly generated easily.

BRIEF DESCRIPTION OF THE DRAWINGS

The patent application file contains at least one drawing executed in color.

FIG. 1 is a schematic diagram showing one embodiment of a manufacturing method of a plugged honeycomb structure according to the present invention;

EXPLANATION ON SYMBOLS

Figure 2:
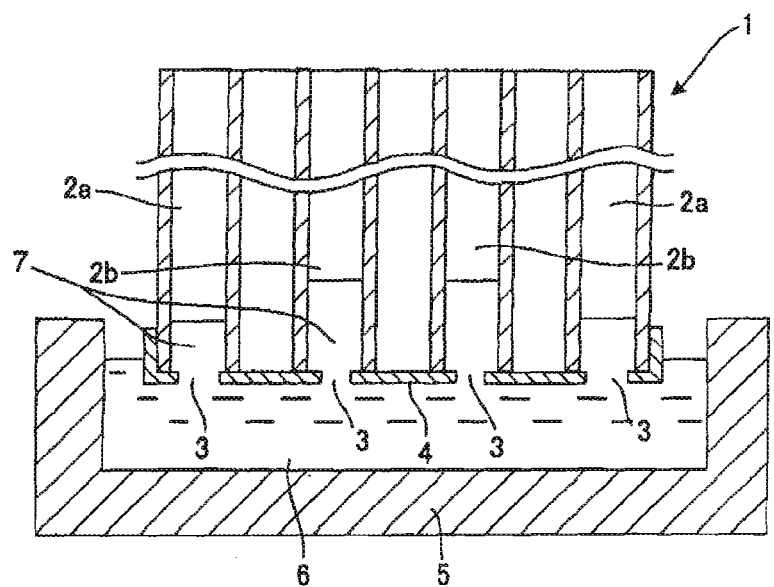
FIG. 2 is a schematic diagram showing a conventional state in which a plugging slurry is allowed to permeate cell opening end portions.

1 . . . honeycomb substrate, 2, 2a, 2b . . . cell, 3 . . . hole, 3a . . . slurry permeation hole, 3b . . . deaeration hole, 4 . . . mask film, 5 . . . container, 6 . . . plugging slurry, 7 . . . cell opening end portion, 10 . . . partition wall, 11 . . . first end surface, 15 . . . plugging portion, 20 . . . slurry filled substrate, 21 . . . second end surface, 25 . . . outer peripheral wall, 27, 29 . . . end surface, 30 . . . plugged honeycomb structure, X . . . diameter of deaeration hole

DESCRIPTION OF THE PREFERRED EMBODIMENT

The best mode for carrying out the present invention will hereinafter be described, but it should be understood that the present invention is not limited to the following embodiment and that appropriate modification, improvement and the like added to the following embodiment based on ordinary knowledge of a person skilled in the art fall in the scope of the present invention.

FIG. 1 is a schematic diagram showing a part of one embodiment of a manufacturing method of a plugged honeycomb structure according to the present invention. The manufacturing method of the plugged honeycomb structure according to the present embodiment is a method of manufacturing a plugged honeycomb structure 30 in which opening end portions (cell opening end portions 7) of predetermined cells 2 of a cylindrical honeycomb substrate 1 provided with a plurality of cells 2 separated by partition walls 10 between end surfaces Ma first end surface 11, a second end surface 21) are filled with a plugging slurry 6, and then fired to form plugging portions 15 at the predetermined cell opening end portions 7. Further details of the manufacturing method of the plugged honeycomb structure according to the present invention will hereinafter be described.

In the manufacturing method of the plugged honeycomb structure according to the present embodiment, first the cylindrical honeycomb substrate 1 provided with the plurality of cells 2 separated by the partition walls 10 so as to communicate the first end surface 11 and the second end surface 21 is prepared (FIG. 1(a).

To prepare the honeycomb substrate 1, first there is used, as a material, powder of one type of material selected from the group consisting of a ceramic such as cordierite, mullite, alumina, spinel, zirconia, silicon carbide, a silicon carbide-cordierite based composite material, a silicon-silicon carbide based composite material, silicon nitride, lithium aluminum silicate, aluminum titanate or zeolite; a metal such as an Fe—Cr—Al based metal; and a combination of these materials. To this material, a binder such as methyl cellulose or hydroxyl propoxyl methyl cellulose is added, and further a surfactant and water are added to obtain a mixed material. Subsequently, the resultant mixed material is formed into a clay having plasticity, extruded and formed into a honeycomb shape, and then dried or fired, so that the honeycomb substrate 1 can be prepared.

An attaching step attaches mask films 4a and 4b to the first end surface 11 and the second end surface 21 of the honeycomb substrate 1 respectively (FIG. 1(b)). There is not any special restriction on a type of the mask films 4a and 4b, but it is preferable that film can be melted by heat and also be perforated by irradiation with laser light. It is preferable to use, as the mask films 4a and 4b, a film having an adhesive layer so as to be fixed on the end surface (the first end surface 11, the second end surface 21) of the honeycomb substrate 1. Specific examples of such a film include a film including a base layer constituted of a polymer material such as polyester, polyolefin or halogenated polyolefin, and the adhesive layer laminated on this base layer and constituted of an acrylic adhesive material. From viewpoints of strength and ease of making holes, it is preferable that a thickness of the mask films 4a and 4b is about 10 to 100 μm.

A first perforation step makes slurry permeation holes 3a at portions of the mask films 4a and 4b corresponding to the predetermined cell opening end portions 7 (FIG. 1(c)). The slurry permeation holes 3a function as inflow ports for allowing a plugging slurry to flow into the cell opening end portions 7 in the subsequent step. It is to be noted that it is preferable to set a diameter of the slurry permeation holes 3a to 30 to 70% of an opening area of the slurry permeation holes 3a, because the plugging slurry having a viscosity described later easily permeates the holes in a satisfactory state. It is further preferable to set the diameter to 40 to 60%, and it is especially preferable to set the diameter to around 50%.

A second perforation step makes deaeration holes 3b at portions of the mask films 4a and 4b facing the portions provided with the slurry permeation holes 3a via the cells 2 (FIG. (d)). The deaeration holes 3b function as outflow ports for discharging, from the cells, air which has been introduced in the cells 2 and which cannot flow outwards, in a case where the plugging slurry is passed into the cell opening end portions 7 through the slurry permeation holes 3a.

A diameter X of the deaeration holes is set to 0.02 to 0.8 mm, preferably 0.04 to 0.6 nm, further preferably 0.05 to 0.4 mm. The diameter X of the deaeration holes is set to this numerical value range, whereby it is difficult (or impossible) to allow the plugging slurry having the viscosity described later to flow outwards or inwards through the deaeration holes 3b, but inflow and outflow of the air are facilitated (or can be performed). Therefore, even in a case where the end surfaces of the honeycomb substrate 1 to which the mask films 4a and 4b having the slurry permeation holes 3a and the deaeration holes 3b have been attached are submerged into the plugging slurry 6, the plugging slurry 6 easily permeates the cell opening end portions 7 from the slurry permeation holes 3a, but does not easily permeate the portions from the deaeration holes 3b (FIG. 1(e)).

There is not any special restriction on a method of making the slurry permeation holes 3a and the deaeration holes 3b in the mask films 4a and 4b, but, for example, a method of making the holes by laser irradiation is preferable. Moreover, the slurry permeation holes 3a and the deaeration holes 3b may be made one by one in the mask films 4a and 4b with one needle, or a large number of the slurry permeation holes 3a and the deaeration holes 3b may collectively be made using bundle needles planted on the plate having a pitch corresponding to that of the cells 2 to be perforated. In addition, it is preferable that images of the first end surface 11 and the second end surface 21 of the honeycomb substrate 1 are processed to extract positions of the cells 2 in which the slurry permeation holes 3a and the deaeration holes 3b are to be made, and the slurry permeation holes 3a and the deaeration holes 3b are made at the extracted positions by use of a laser marker, so that even the honeycomb substrate 1 in which the pitch and an opening shape of the cells 2 are not constant can flexibly be handled. It is to be noted that in a case where the slurry permeation holes and the deaeration holes are made by the laser irradiation, to regulate diameters of these holes, intensity of laser may appropriately be regulated.

A filling step first submerges the first end surface 11 and the second end surface 21 to which the mask films 4a and 4b of the honeycomb substrate 1 have been attached into the plugging slurry 6 having a predetermined viscosity, respectively, and fills the cell opening end portions 7 with the plugging slurry 6 to obtain a slurry filled substrate 20 (FIGS. 1(e) and (f). The plugging slurry has a viscosity of 0.5 to 2000 Pa·s, preferably 1 to 1500 Pa·s. The viscosity of the plugging slurry is set to this numerical value range, whereby it is difficult (or impossible) for the plugging slurry to flow inwards or outwards through the deaeration holes 3b having the diameter (X) in the above numerical value range, but the inflow and outflow of the air are facilitated (or can be performed). Therefore, even when the first end surface 11 and the second end surface 21 of the honeycomb substrate 1 are submerged into the plugging slurry 6, respectively, the plugging slurry 6 easily permeates the cell opening end portions 7 through the slurry permeation holes 3a, but does not remarkably easily permeate the portions from the deaeration holes 3b. Therefore, the plugging slurry 6 does not remarkably easily permeate the cells 2 which are not to be permeated by the plugging slurry 6, a plugging defect is not easily generated, and hence a manufacturing yield can be improved. Furthermore, with regard to the air in the cells 2, the plugging slurry 6 permeates the cells 2 through the slurry permeation holes 3a, whereby the air is quickly discharged from the deaeration holes 3b. Therefore, a plugged honeycomb structure can easily be manufactured in which the plugging slurry 6 can uniformly permeate into a desired depth of the cells 2 and in which plugging portions have high reliability.

It is to be noted that in a case where the plugging slurry 6 having thixotropy is used, when the plugging slurry 6 permeates the cell opening end portions 7, it is preferable to fill the cell opening end portions 7 with the plugging slurry 6 while vibrating the slurry by use of an ultrasonic generator or the like, because the plugging slurry 6 can more uniformly permeate into the desired depth of the cells 2.

The plugging slurry can be prepared by mixing at least ceramic powder and a dispersion medium for the slurry. Preferable examples of the dispersion medium for the slurry include an organic solvent such as acetone, ethanol or methanol, and water.

To the plugging slurry, if necessary, an additive such as a binder or deflocculant may further be added. There is not any special restriction on a type of the ceramic powder, but, for example, silicon carbide powder, cordierite powder or the like may preferably be used. As the binder, a resin such as polyvinyl alcohol (PVA) may be used, but it is more preferable to use a thermal gel setting binder having a property of gelating by heating. As the thermal gel setting binder, methyl cellulose may preferably be used.

After the slurry filled substrate 20 is obtained, if necessary, the slurry filled substrate is dried, and heated and/or fired, so that the plugged honeycomb structure 30 provided with the plugging portions 15 can be manufactured (FIG. 1(g)) It is to be noted that in general the plugged honeycomb structure 30 can be manufactured by performing the filling step of filling the predetermined cell opening end portions 7 with the plugging slurry 6 and then performing the firing, but the filling step may be performed with respect to an unfired honeycomb structure formed body (a dried body), or a fired honeycomb structure body.

Figure 3:
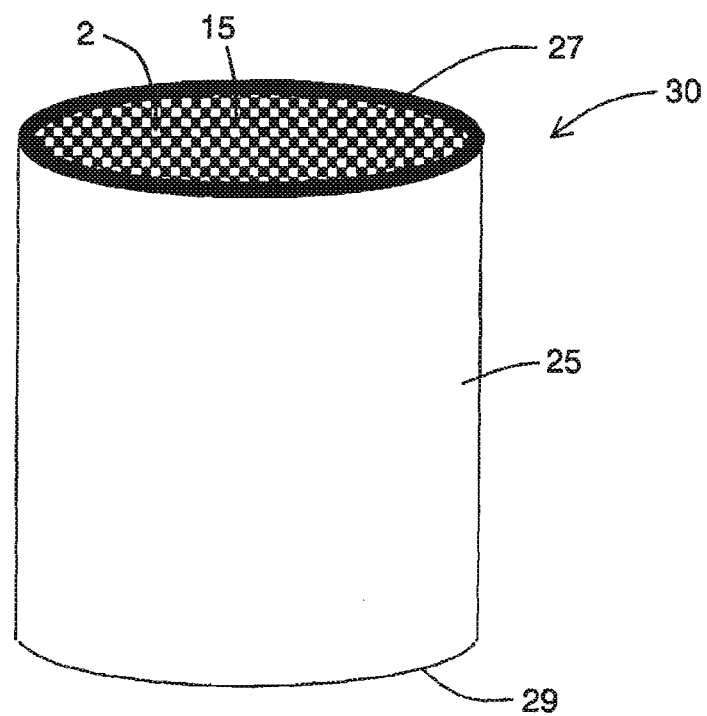
FIG. 3 is a perspective view showing one example of the plugged honeycomb structure.

For example, as shown in FIG. 3, in the plugged honeycomb structure 30 manufactured according to the manufacturing method of the plugged honeycomb structure of the present invention, as long as the plurality of cells 2 are separated by the porous partition walls and extend from one end surface 27 to the other end surface 29 in an axial, direction and the cells 2 have the plugging portions 15 arranged at either of the end surfaces 27 and 29 so as to plug the end surfaces, there is not any restriction on a shape of the structure. It is to be noted that reference numeral 25 in FIG. 3 is an outer peripheral wall which surrounds an outer periphery of the partition walls.

A sectional shape of the plugged honeycomb structure crossing an extending direction of the cells at right angles can appropriately be adopted from a circular shape, an elliptic shape, a race-track shape, a quadrangular shape and the like based on an application and an installation place. A sectional shape of the cell crossing the extending direction of the cell at right angles may be selected from a polygonal shape such as a triangular shape, a quadrangular shape or a hexagonal shape, a substantially polygonal shape, a circular shape and a substantially circular shape such as an elliptic shape. A cell density is usually set to 6 to 2000 cells/square inch (0.9 to 311 cells/cm$^2$), preferably about 50 to 1000 cells/square inch (7.8 to 155 cells/cm$^2$). When the plugged honeycomb structure 30 (see FIG. 3) is used as a catalyst carrier or a filter, it is preferable that the partition walls and the outer peripheral wall 25 are porous.

EXAMPLES

The present invention will hereinafter specifically be described in accordance with examples, but the present invention is not limited to these examples.

(Preparation of Honeycomb Substrate)

A mixed material made of cordierite, an organic binder, a pore former and water was formed into a honeycomb shape, and then dried to prepare a cylindrical honeycomb substrate having an outer diameter of 140 mm and a length of 150 mm. In the prepared honeycomb substrate, a cell had a square sectional shape crossing an extending direction of the cell at right angles, partition walls had a thickness of about 0.3 mm, a cell density was 300 cells/square inch, and a cell pitch was 1.5 mm.

(Preparation of Plugging Slurry)

Appropriate amounts of methyl cellulose, glycerin and water were added to cordierite powder, and kneaded to prepare four types of plugging slurries having viscosities of 1 Pa·s, 1000 Pa·s, 1500 Pa·s and 2000 Pa·s.

Example 1

Mask films (material: polyester, thickness: mm, trade name "Masking Tape", manufactured by 3M Co.) were attached to both end surfaces (a first end surface and a second end surface) of one of honeycomb substrates, and slurry permeation holes were made at portions of the attached mask films corresponding to predetermined cell opening end portions (so as to obtain a checkered pattern) by use of laser. Subsequently, deaeration holes having a diameter of 0.05 mm were made at portions of the mask films facing the portions provided with the slurry permeation holes via cells by use of the laser. Afterward, the first end surface of the honeycomb substrate was submerged into a depth of 5 mm in a plugging slurry having a viscosity of 1 Pa·s to fill the cell opening end portions with the plugging slurry through the slurry permeation holes of the mask film.

After pulling up the honeycomb substrate from the plugging slurry, the honeycomb substrate was dried at 100° C. for 120 seconds. Afterward, in the same manner as in the above first end surface, the second end surface of the honeycomb substrate was submerged into the plugging slurry to fill the cell opening end portions at the other end surface of the honeycomb substrate with the plugging slurry. The honeycomb substrate was dried at 100° C. for 120 seconds, and fired for 50 hours to manufacture a plugged honeycombs structure.

Figure 4:
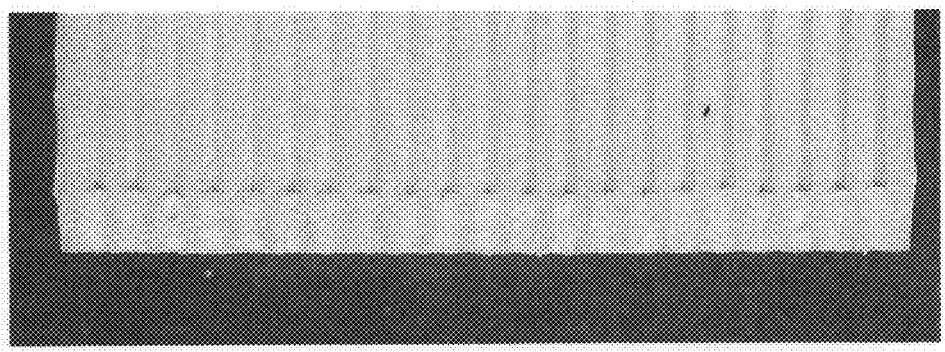
FIG. 4 is a photograph of a partially sectional structure of a plugged honeycomb structure manufactured in Example 1.

When an average plugging depth (mm) of the plugging portions of the manufactured p lugged honeycomb structure was measured, the depth was 5.00 mm at the first end surface, the depth was 4.98 mm, at the second end surface, and an average of the depths of the first and second end surfaces was 4.99 mm. It is to be noted that an average achievement ratio of the plugging depth with respect to a target depth (5 mm) was 100%. Moreover, a photograph of a partially sectional structure of the plugged honeycomb structure manufactured in Example 1 is shown in FIG. 4.

Examples 2 to 6 and Comparative Examples 1 to 6

Figure 5:
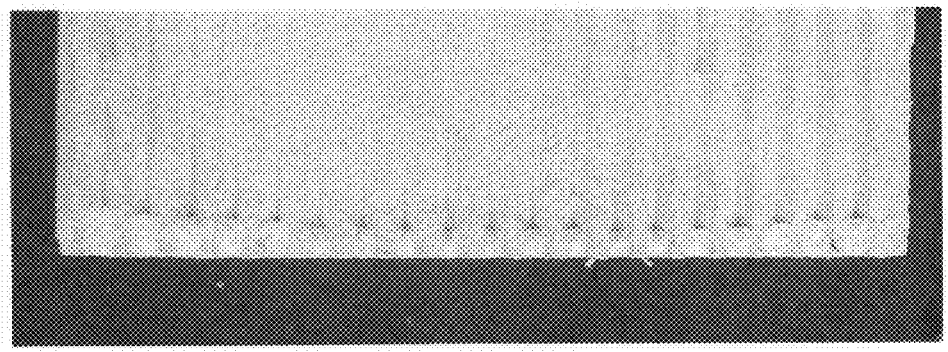
FIG. 5 is a photograph of a partially sectional structure of a plugged honeycomb structure manufactured in Comparative Example 1.

Plugged honeycomb structures were manufactured in the same manner as in Example 1 except that a perforation method of deaeration holes, a diameter (X) of the deaeration holes, a viscosity of a plugging slurry and a vibration frequency were set to a method and numeric values shown in Table 1, respectively. Plugging portions of the manufactured plugged honeycomb structures were measured in the same manner as in Example 1. Results are shown in Table 1. Moreover, a photograph of a partially sectional structure of the plugged honeycomb structure manufactured in Comparative Example 1 is shown in FIG. 5.

As shown in Table 1, in the methods of Examples 1 to 5, as compared with the methods of Comparative Examples 1 to 5, it is clear that the plugging slurry permeates into a desired depth and the plugging portion having a sufficient depth is formed. According to the methods of Examples 1 to 5, it is clear that the plugged honeycomb structure having an excellent quality can be manufactured without causing the plugging failure. It is to be noted that for reference, in a case where a plugging slurry having a viscosity in excess of 2500 Pa·s is used, the plugging slurry does not easily retain properties of the slurry, and it has been difficult for the plugging slurry to permeate the cells.

A manufacturing method of a plugged honeycomb structure according to the present invention is preferable as a method of manufacturing a plugged honeycomb structure for use in a filter such as DPF.

What is claimed is:

1. A manufacturing method of a plugged honeycomb structure including a cylindrical honeycomb substrate in which a plurality of cells having two opening end portions are separated by partition walls and formed so as to communicate with both end surfaces of the honeycomb substrate, and plugging portions arranged so as to plug one of the two opening end portions of the cells and form a complementary checkered pattern with one end surface and the other end surface of the honeycomb substrate, the method comprising:
    an attaching step of attaching mask films to both the end surfaces of the honeycomb substrate, respectively;
    a first perforation step of making slurry permeation holes at portions of the mask films corresponding to the one opening end portion of each of the predetermined cells;
    a second perforation step of making deaeration holes having a diameter of 0.02 to 0.8 mm at portions of the mask films facing the portions provided with the slurry permeation holes via the cells;
    a filling step of submerging both the end surfaces of the honeycomb substrate to which the mask films have been attached into a plugging slurry having a viscosity of 0.5 to 2000 Pa·s, respectively, and filling the one opening

TABLE 1

|  | Perforation method of deaeration holes | Diameter (X) of deaeration hole (mm) | Viscosity of plugging slurry (Pa·s) | Vibration frequency (HZ) | Average plugging depth (mm) | | | Average target depth achievement ratio (%) | Remarks |
| --- | --- | --- | --- | --- | --- | --- | --- | --- | --- |
|  |  |  |  |  | First end surface | Second end surface | Average of first and second end surfaces |  |  |
| Example 1 | Laser | 0.02 | 0.5 | — | 4.68 | 4.35 | 4.52 | 90% |  |
| Example 2 | Pin | 0.02 | 0.5 | — | 4.70 | 4.33 | 4.52 | 90% |  |
| Example 3 | Laser | 0.1 | 1 | — | 4.69 | 4.63 | 4.66 | 93% |  |
| Example 4 | Laser | 0.1 | 1000 | 60 | 5.01 | 5.00 | 5.01 | 100% |  |
| Example 5 | Laser | 0.1 | 2000 | 60 | 4.53 | 4.49 | 4.51 | 90% |  |
| Example 6 | Laser | 0.8 | 2000 | 60 | 4.64 | 4.50 | 4.57 | 91% |  |
| Comparative Example 1 | — | — | 0.5 | — | 3.11 | 1.59 | 2.35 | 47% | *1 |
| Comparative Example 2 | — | — | 0.5 | 60 | 4.53 | 2.22 | 3.38 | 68% | *2 |
| Comparative Example 3 | Laser | 0.01 | 0.5 | 60 | 3.64 | 3.33 | 3.49 | 70% | *1 |
| Comparative Example 4 | Laser | 0.1 | 0.4 | 60 | 5.21 | 5.12 | 5.17 | 103% | *3 |
| Comparative Example 5 | Laser | 0.1 | 2500 | 60 | 1.88 | 1.05 | 1.47 | 29% | *1 |
| Comparative Example 6 | Laser | 1 | 2000 | 60 | 4.98 | 4.88 | 4.93 | 99% | *3 |

*1: Difficult for plugging slurry to permeate
*2: Plugging slurry slightly easily permeates by vibrating slurry, but it is difficult for slurry to permeate
*3: Plugging slurry permeates from deacration holes end portion of each of the predetermined cells with the plugging slurry to obtain a slurry filled substrate; and a firing step of firing the resultant slurry filled substrate, wherein the filling step is performed after both the first and second perforation steps are performed and while the mask films are attached to both end surfaces.

2. The manufacturing method of the plugged honeycomb structure according to claim 1, wherein the deaeration holes have a diameter in a range of 0.05 to 0.4 mm.

3. The manufacturing method of the plugged honeycomb structure according to claim 1, wherein the plugging slurry has a viscosity in a range of 1 to 1500 Pa·s.

4. The manufacturing method of the plugged honeycomb structure according to claim 2, wherein the plugging slurry has a viscosity in a range of 1 to 1500 Pa·s.

5. The manufacturing method of the plugged honeycomb structure according to claim 1, wherein the plugging slurry has thixotropy, and one opening end portion of each of the predetermined cells is filled with the plugging slurry while vibrating the plugging slurry.

6. The manufacturing method of the plugged honeycomb structure according to claim 3, wherein the plugging slurry has thixotropy, and one opening end portion of each of the predetermined cells is filled with the plugging slurry while vibrating the plugging slurry.

7. The manufacturing method of the plugged honeycomb structure according to claim 4, wherein the plugging slurry has thixotropy, and one opening end portion of each of the predetermined cells is filled with the plugging slurry while vibrating the plugging slurry.

* * * * *